(12) United States Patent
Alvarez et al.

(10) Patent No.: US 7,641,113 B1
(45) Date of Patent: Jan. 5, 2010

(54) SYSTEMS AND METHODS FOR GENERATING REVENUE FROM BANKING TRANSACTIONS USING A STORED-VALUE CARD

(75) Inventors: David R. Alvarez, San Bruno, CA (US); Mitchell A. Shapiro, San Bruno, CA (US)

(73) Assignee: Nexxo Financial, Inc., San Bruno, CA (US)

( * ) Notice: Subject to any disclaimer, the term of this patent is extended or adjusted under 35 U.S.C. 154(b) by 677 days.

(21) Appl. No.: 10/966,497

(22) Filed: Oct. 15, 2004

Related U.S. Application Data

(60) Provisional application No. 60/512,290, filed on Oct. 17, 2003.

(51) Int. Cl.
*G06F 7/08* (2006.01)

(52) U.S. Cl. .................... 235/381; 235/380; 705/79

(58) Field of Classification Search ................. 235/381; 902/8, 14, 30; 705/41, 43
See application file for complete search history.

(56) References Cited

U.S. PATENT DOCUMENTS

| | | | |
|---|---|---|---|
| 5,350,906 A | 9/1994 | Brody et al. | |
| 5,440,108 A | 8/1995 | Tran et al. | |
| 5,649,118 A | 7/1997 | Carlisle et al. | |
| 5,686,713 A | 11/1997 | Rivera | |
| 5,864,830 A | 1/1999 | Armetta et al. | |
| 5,897,625 A | 4/1999 | Gustin et al. | |
| 5,937,396 A | 8/1999 | Konya | |
| 5,940,811 A | 8/1999 | Norris | |
| 5,949,046 A | 9/1999 | Kenneth et al. | |
| 5,963,647 A | 10/1999 | Downing et al. | |
| 6,012,048 A | 1/2000 | Gustin et al. | |
| 6,044,360 A | 3/2000 | Picciallo | |
| 6,105,009 A | 8/2000 | Cuervo | |
| 6,129,275 A | 10/2000 | Urquhart et al. | |
| 6,141,438 A | 10/2000 | Blanchester | |
| 6,298,336 B1 | 10/2001 | Davis et al. | |
| 6,327,573 B1 | 12/2001 | Walker et al. | |
| 6,467,684 B2 | 10/2002 | Fite et al. | |
| 6,473,500 B1 * | 10/2002 | Risafi et al. ................ 235/379 |
| 6,575,362 B1 | 6/2003 | Bator et al. | |

(Continued)

FOREIGN PATENT DOCUMENTS

FR 002790128 A1 8/2000

(Continued)

OTHER PUBLICATIONS

U.S. Appl. No. 11/657,425, David R. Alvarez, Self-Service Money Remittance with an Access Card, filed Jan. 23, 2007.

(Continued)

*Primary Examiner*—Michael G Lee
*Assistant Examiner*—Kristy A Haupt
(74) *Attorney, Agent, or Firm*—Carr & Ferrell LLP

(57) ABSTRACT

Systems and methods for generating revenue from banking transactions use a kiosk to perform financial services. The kiosk determines a stored-value account related to a stored-value card for a user of the kiosk. The kiosk performs a banking transaction using the stored-value account. The kiosk then determines a service fee for the banking transaction. The kiosk deducts the service fee from the stored-value account or a value of the banking transaction.

37 Claims, 5 Drawing Sheets

U.S. PATENT DOCUMENTS

| | | |
|---|---|---|
| 6,578,761 B1 | 6/2003 | Spector |
| 6,598,794 B1 | 7/2003 | Ishii |
| 6,609,113 B1 | 8/2003 | O'Leary et al. |
| 6,619,545 B2 | 9/2003 | Harris |
| 6,636,833 B1 | 10/2003 | Flitcroft et al. |
| 6,659,259 B2 | 12/2003 | Knox et al. |
| 6,758,394 B2 * | 7/2004 | Maskatiya et al. .......... 235/379 |
| 6,999,569 B2 | 2/2006 | Risafi et al. |
| 2001/0011680 A1 | 8/2001 | Soltesz et al. |
| 2001/0013018 A1 | 8/2001 | Awano |
| 2001/0042784 A1 | 11/2001 | Fite et al. |
| 2001/0054019 A1 | 12/2001 | de Fabrega |
| 2002/0091937 A1 | 7/2002 | Ortiz |
| 2002/0179401 A1 | 12/2002 | Knox et al. |
| 2002/0198806 A1 | 12/2002 | Blagg et al. |
| 2003/0046249 A1 * | 3/2003 | Wu ............................. 705/79 |
| 2003/0080185 A1 | 5/2003 | Werther |
| 2003/0088470 A1 * | 5/2003 | Cuervo ........................ 705/41 |
| 2003/0105714 A1 | 6/2003 | Alarcon-Luther et al. |
| 2003/0200180 A1 | 10/2003 | Phelan, III et al. |
| 2003/0218062 A1 | 11/2003 | Noriega et al. |
| 2004/0007618 A1 | 1/2004 | Oram et al. |
| 2004/0059953 A1 | 3/2004 | Purnell |
| 2004/0091136 A1 | 5/2004 | Dombrowski |
| 2004/0223629 A1 | 11/2004 | Chang |
| 2005/0269415 A1 | 12/2005 | Licciardello et al. |
| 2006/0032911 A1 | 2/2006 | Arias |
| 2006/0037835 A1 | 2/2006 | Doran et al. |
| 2006/0064379 A1 * | 3/2006 | Doran et al. .................. 705/43 |
| 2006/0069642 A1 * | 3/2006 | Doran et al. .................. 705/39 |

FOREIGN PATENT DOCUMENTS

| | | |
|---|---|---|
| WO | WO 96/36936 | 11/1996 |
| WO | WO 97/10562 | 3/1997 |

OTHER PUBLICATIONS

U.S. Appl. No. 10/966,925, David R. Alvarez, Systems and Methods for Generating Revenue from Multi-Card Money Sharing, filed Oct. 15, 2004.

U.S. Appl. No. 10/966,299, James V. Elliott, Systems and Methods for Biometric Identification and Verification of a User of a Kiosk, filed Oct. 15, 2004.

U.S. Appl. No. 10/966,958, David R. Alvarez, Systems and Methods for Money Sharing, filed Oct. 15, 2004.

U.S. Appl. No. 10/966,496, David R. Alvarez, Systems and Methods for Identifying and Verifying a User of a Kiosk Using an External Verification System, filed Oct. 15, 2004.

U.S. Appl. No. 10/966,879, David R. Alvarez, Systems and Methods for Banking Transactions Using a Stored-Value Card, filed Oct. 15, 2004.

* cited by examiner

SYSTEMS AND METHODS FOR GENERATING REVENUE FROM BANKING TRANSACTIONS USING A STORED-VALUE CARD

CROSS-REFERENCE TO RELATED APPLICATIONS

This application claims the benefit of U.S. Provisional Application Ser. No. 60/512,290 titled "Systems and Methods for Money Sharing," filed Oct. 17, 2003, which is hereby incorporated by reference.

BACKGROUND

1. Field of the Invention

The present invention relates generally to financial services, and more particularly to systems and methods for generating revenue from banking transactions using a stored-value card.

2. Description of the Prior Art

Customers use automatic teller machines (ATMs) to conduct banking transactions such as deposits, withdrawals, balance inquiries, and transfers between traditional bank accounts. ATMs require ATM/debit cards with associated Personal Identification Number (PIN). Some ATMs charge service fees for withdrawals. Some service fees are calculated from increased exchange rates for foreign currency conversions. One problem with ATM/debit cards is that a bank customer must physically go to a branch of a bank to set up a traditional bank account because ATM/debit cards have a traditional bank account, such as a demand deposit account (DDA), associated with it. The bank typically checks the customer's identity based on their driver's license or other documentation and collects personal information such as address, date of birth, and Social Security number. Banks need to verify identification to prevent fraud and/or improve security for the customer's banking transactions. Furthermore, there may be government regulations that require proof of identity before using bank accounts to prevent illegal activities such as money laundering and funding of terrorist activities.

Another problem is that the funds deposited into an ATM machine are not immediately available for withdrawal. For example, if a customer deposits cash or a check in a deposit envelope, the deposited amount is not immediately available until a bank employee services the ATM machine to collect and process the deposits.

Customers have also used credit cards for banking transactions. One problem with credit cards is that a person usually needs to have good credit to have a credit line issued for a credit card. Another problem is that credit cards can take weeks to issue from a bank. After receiving and approving a credit card application, the credit card is then mailed to the person's address.

Another problem relates to a large population of US residents (by some estimates as much as 50 million) that are poorly served by the banking system—the "under-banked" or the "unbanked". This population is generally excluded from traditional banking products (checking accounts, credit cards, debit cards) or moves in and out of eligibility for them—as banks offering them generally require good credit and/or unreasonably large security deposits in order to obtain these services. People may be excluded for any number of reasons such as having unfortunate circumstances like a divorce or serious medical problem adversely impact their credit standing, or such as making mistakes with their credit coming out of college leading to poor credit or a bankruptcy, or such as having no established credit history because they are a recent immigrant or someone who chooses to conduct their financial affairs primarily with cash. The reason banks generally exclude these groups of people from their service offerings is the cost and risk associated with the products, particularly credit cards and checking accounts. Therefore, these people may be excluded from certain financial transactions that require credit cards or debit cards. In one example, a person without a credit card cannot make purchases over the Internet, buy products from a catalogue, reserve a hotel room or rental car, purchase airline tickets, or even rent a movie, which may require a credit card. Thus, there is a need to provide convenient, cost-effective, lower risk financial services to this population.

In one prior art solution provided by 7-Eleven, a VCOM kiosk provides banking transactions such as money transfer, printing checks, and check cashing based on a deposited amount. However, a customer must also interact with a cashier in addition to the VCOM kiosk to perform the banking transactions. Also, the card associated with the VCOM kiosk is only used for identification purposes. Other kiosks manufactured by Blackstone issue cards, but the cards are calling cards.

Stored-value cards typically have been used for providing payment for goods or services after a user has deposited money into the stored-value card. For example, stored-value cards have been used as gift cards and as cards that provide payment for coffee or copies.

SUMMARY OF THE INVENTION

The invention addresses the above problems by providing systems and methods for banking transactions that generates revenue and that use a kiosk to perform financial services. The kiosk determines a stored-value account related to a stored-value card for a user of the kiosk. The kiosk performs a banking transaction using the stored-value account. The kiosk then determines a service fee for the banking transaction. The kiosk deducts the service fee from the stored-value account or a value of the banking transaction.

In some embodiments, the service fee is a flat fee. In some embodiments, the service fee is based on a calculation that is a percentage of the value of the banking transaction. In some embodiments, the service fee is based on a calculation that uses an exchange rate for a foreign currency conversion. In some embodiments, the kiosk dispenses the stored-value card.

These systems and methods advantageously generate revenue from providing banking transactions using unattended kiosks and stored-value cards. These systems and methods generate revenue by charging service fees from the provision of banking transactions. Users can conduct banking transactions without having to visit a branch of a bank. Furthermore, users can also conveniently perform banking transactions using stored-value cards and stored-value accounts without setting up and maintaining a traditional bank account. A banking transaction is any financial dealing or action related to account activity such as deposits, withdrawals, purchases, transfers, account inquiries, and printing of financial instruments. In some embodiments, users will not be required to visit a branch office of a bank to set up a traditional bank account before being issued a stored-value card for banking transactions.

In some embodiments, another advantage is that the user can conduct banking transactions using stored-value cards without being subject to credit checks, extensive background checks, or large deposit requirements. Also, the costs of providing banking transactions are reduced because of the use of an unattended kiosk. In some cases, by requiring cash payment, the risks that banks take in providing banking transaction using stored-value cards are reduced, and the amount deposited in the stored-value account may be available in real-time for other banking transactions. Thus, in some embodiments, banks can provide a broad array of services for banking transactions using stored-value cards to the unbanked population because of the cost-effectiveness and the reduced risks.

DETAILED DESCRIPTION OF THE INVENTION

Figure 1:
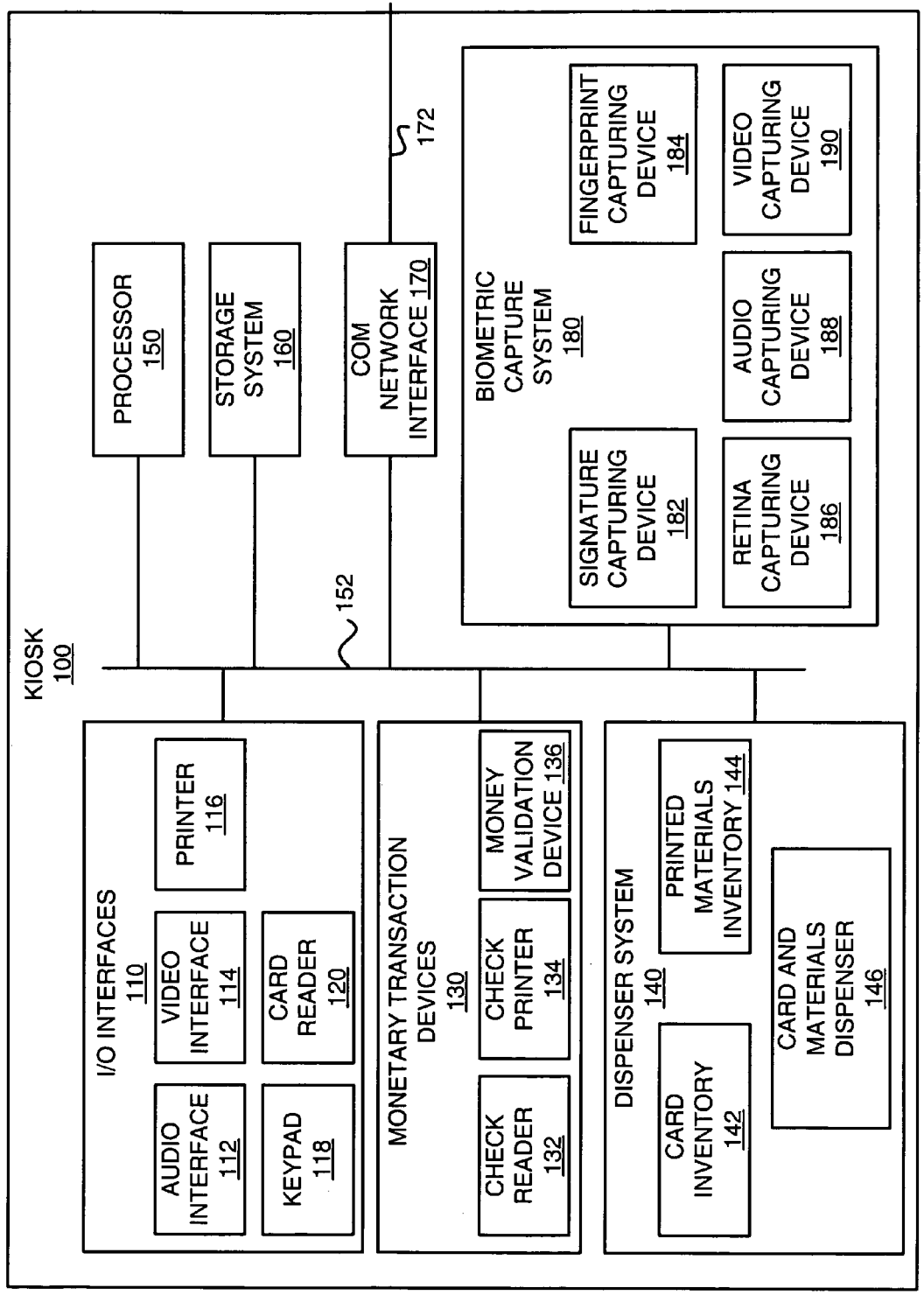
FIG. 1 is a block diagram of a kiosk in an exemplary embodiment of the invention.

The present inventions provide systems and methods for generating revenue from banking transactions using a stored-value card. Those skilled in the art will recognize that various features disclosed in connection with the embodiments may be used either individually or jointly. It is to be appreciated that while the present inventions have been described with reference to preferred implementations, those having ordinary skill in the art will recognize that the present inventions may be beneficially utilized in any number of environments and implementations.

The inventions have been described below with reference to specific embodiments. It will be apparent to those skilled in the art that various modifications may be made and other embodiments can be used without departing from the broader scope of the inventions. Therefore, these and other variations upon the specific embodiments are intended to be covered by the present inventions.

The systems and methods that generate revenue from banking transactions use a kiosk to perform financial services. The kiosk determines a stored-value account related to a stored-value card for a user of the kiosk. The kiosk then performs a banking transaction using the stored-value account. The kiosk determines a service fee for the banking transaction. The kiosk then deducts the service fee from the stored-value account or a value of the banking transaction.

A stored-value account is monetary value associated with a card that does not require a credit line or a traditional bank account, such as a demand deposit account ("DDA") or brokerage account. A stored-value card is any card that is associated with a stored-value account. A banking transaction is any financial dealing or action related to account activity such as deposits, withdrawals, purchases, transfers, account inquiries, and printing of financial instruments. A service fee is any amount charged to a user for a banking transaction. In some embodiments, the service fee is a flat fee. In other embodiments, the service fee is based on a calculation of the banking transaction.

These systems and methods advantageously generate revenue from providing banking transactions using unattended kiosks and stored-value cards. These systems and methods generate revenue by charging service fees from the provision of banking transactions. Users can conduct banking transactions without having to visit a branch of a bank. Furthermore, users can also conveniently perform banking transactions using stored-value cards and stored-value accounts without setting up and maintaining a traditional bank account. A banking transaction is any financial dealing or action related to account activity such as deposits, withdrawals, purchases, transfers, account inquiries, and printing of financial instruments. In some embodiments, users will not be required to visit a branch office of a bank to set up a traditional bank account before being issued a stored-value card for banking transactions.

In some embodiments, another advantage is that the user can conduct banking transactions using stored-value cards without being subject to credit checks, extensive background checks, or large deposit requirements. Also, the costs of providing banking transactions are reduced because of the use of an unattended kiosk. In some cases, by requiring cash payment, the risks that banks take in providing banking transaction using stored-value cards are reduced, and the amount deposited in the stored-value account may be available in real-time for other banking transactions. Thus, in some embodiments, banks can provide a broad array of services for banking transactions using stored-value cards to the unbanked population because of the cost-effectiveness and the reduced risks.

FIG. 1 is a block diagram of a kiosk 100 in an exemplary embodiment of the invention. The overall operation of the kiosk 100 will be discussed below in FIGS. 4-5. The kiosk 100 is any unattended mechanism, device, or system that is designed for public access and provides users access to accounts or financial services. In one embodiment, the kiosk 100 includes input/output (I/O) interfaces 110, monetary transaction devices 130, a dispenser system 140, a processor 150, a bus 152, a storage system 160, a communication network interface 170, a communication link 172, and a biometric capture system 180.

The bus 152 is coupled to the I/O interfaces 110, the monetary transaction devices 130, the dispenser system 140, the processor 150, the storage system 160, the communication network interface 170, and the biometric capture system 180. The communication link 172 is coupled to the communication network interface 170.

The I/O interfaces 110 are any interfaces or devices configured to provide input or output to a user of the kiosk 100. In one embodiment, the I/O interfaces 110 include an audio interface 112, a video interface 114, a printer 116, a keypad 118, and a card reader 120. The audio interface 112 is any device or system configured to audibly communicate between the user and the kiosk 100. Some examples of an audio interface 112 are speakers and a microphone. The video interface 114 is any device or system configured to visually communicate between the user and the kiosk 100. One example of the video interface 114 is a touch-screen display. The printer 116 is a printer configured to print transaction records. The keypad 118 is a standard numeric or alphanumeric keypad. The card reader 120 is a conventional card reader configured to read ATM cards, stored-value cards, debit cards, credit cards, and/or identification cards. In other embodiments, the card reader 120 may be a reader that optically, magnetically or electrically scans cards.

The monetary transaction devices 130 are any mechanisms, devices, or systems configured to receive or provide monetary instruments such as checks, money orders, drafts, and currency. In one embodiment, the monetary transaction devices 130 include a check reader 132, a check printer 134, and a money validation device 136. The check reader 132 is a reader configured to read and validate checks. The check printer 134 is a printer configured to print financial instruments such as checks, drafts, or money orders. The money validation device 136 is a conventional device configured to accept and validate currency such as bills and coins. In other embodiments, the monetary transaction devices 130 include a money order printer and a money order reader, which are not shown in FIG. 1.

The dispenser system 140 is any device or system configured to dispense cards or printed materials related to financial services. In one embodiment, the dispenser system 140 includes a card inventory 142, a printed materials inventory 144, and a card and materials dispenser 146.

The processor 150 is configured to execute software or instructions in accord with the operations discussed below. The storage system 160 is any storage device, memory, or group of storage devices configured to store data permanently or temporarily. The communication network interface 170 is any communication interface configured to transfer data among any components connected to the bus 152 and any communication network.

The biometric capture system 180 is any mechanism, device, or system configured to capture biometric information from a user of the kiosk 100. Biometric information is any physiological information or data that indicates a representation of a person. Some examples of biometric information are fingerprints, retina scans, audio images, signatures, and video images.

Figure 2:
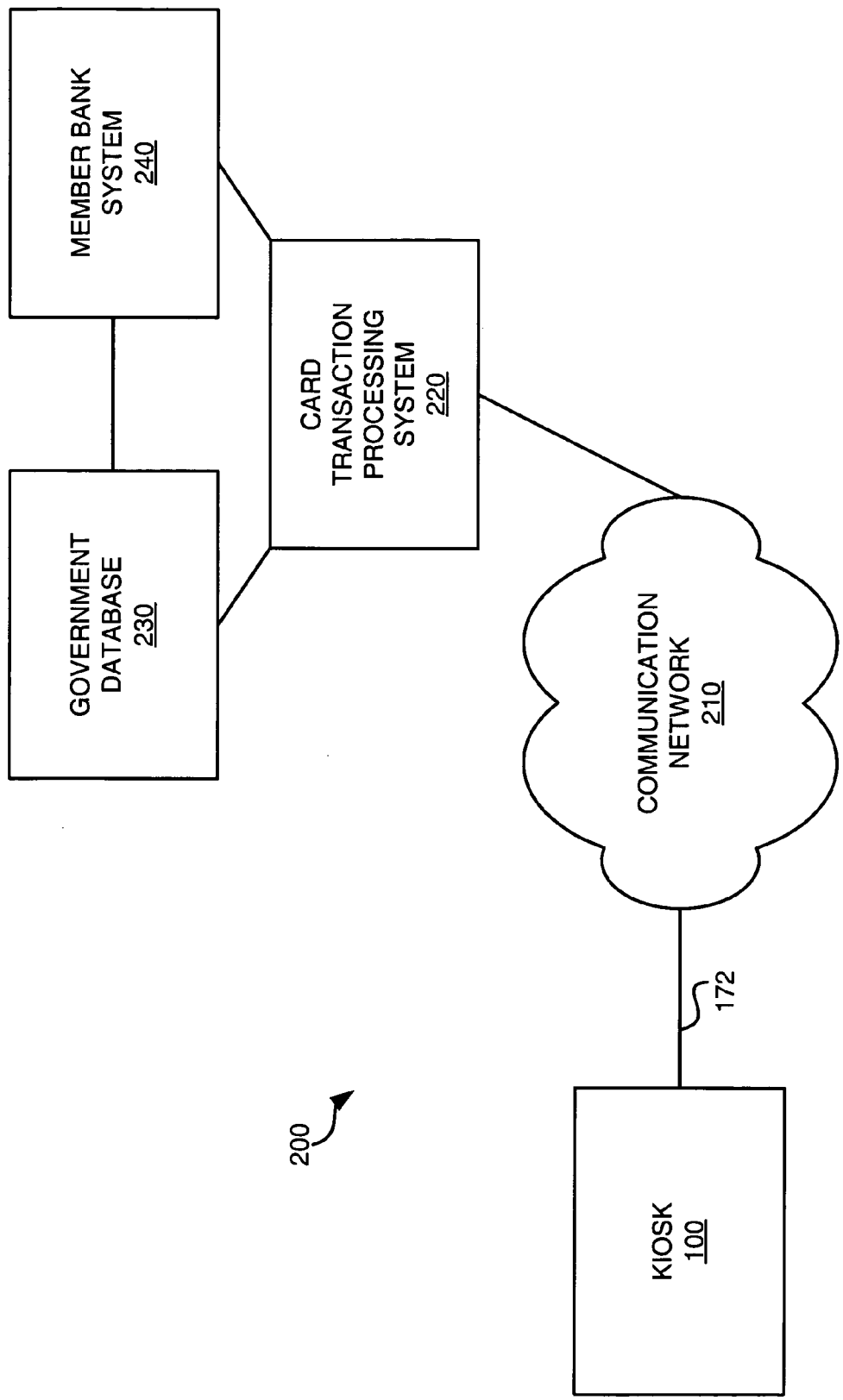
FIG. 2 is a system for financial services in an exemplary embodiment of the invention.

FIG. 2 is a block diagram of a system 200 for financial services in an exemplary implementation of the invention. The system 200 for financial services includes a kiosk 100, a communication network 210, a card transaction processing system 220, a government database 230, and a member bank system 240. The kiosk 100 is coupled to the communication network 210 via the communication link 172. The communication network 210 is coupled to the card transaction processing system 220. The card transaction processing system 220 is coupled to the government database 230 and the member bank system 240. The government database 230 is coupled to the member bank system 240.

The operations of the kiosk 100 will be discussed in greater detail below in FIGS. 4-5. For the sake of simplicity, only one kiosk 100 is shown in FIG. 2. Those skilled in the art will understand that there may be numerous kiosks attached to the communication network 210.

The communication network 210 is any conventional communication network configured to transfer data for card processing and financial transactions. In one embodiment, the communication network 210 includes a supernetwork configured to manage a couple of sub-networks. Some of these sub-networks handle financial communications for managing transactions, deposits, withdrawals, and balance checks. Additionally, some of these sub-networks handle security communications that verify the card, validate personal ID, and check against government databases.

The card transaction processing system 220 is any system configured to process card transactions. In one embodiment, a company called TSYS operates the card transaction processing system 220. The government database 230 is any database that contains government information for individual identification for security and/or law enforcement. Some examples of government information are fingerprints, voice samples, photo identification, identification cards, and personal data. In some embodiments, the government database 230 is used to check against known terrorist or other government mandated lists before activating the card or accepting additional cash. Moreover, the government database 230 can be used to notify the government of the time, place, and amount of each cash deposit and withdrawal. In some embodiments, the cash has limited acceptance by time period (e.g. day, week, month, and year) using the government database 230. In other embodiments, the government database 230 assures compliance with applicable regulations and in real time if necessary. The member bank system 240 is a conventional banking system for processing financial transactions.

In some embodiments, the banking transactions are for one stored-value account. In other embodiments, the banking transactions may involve multiple related stored-value accounts or at least one stored-value account and other types of related accounts.

Figure 3:
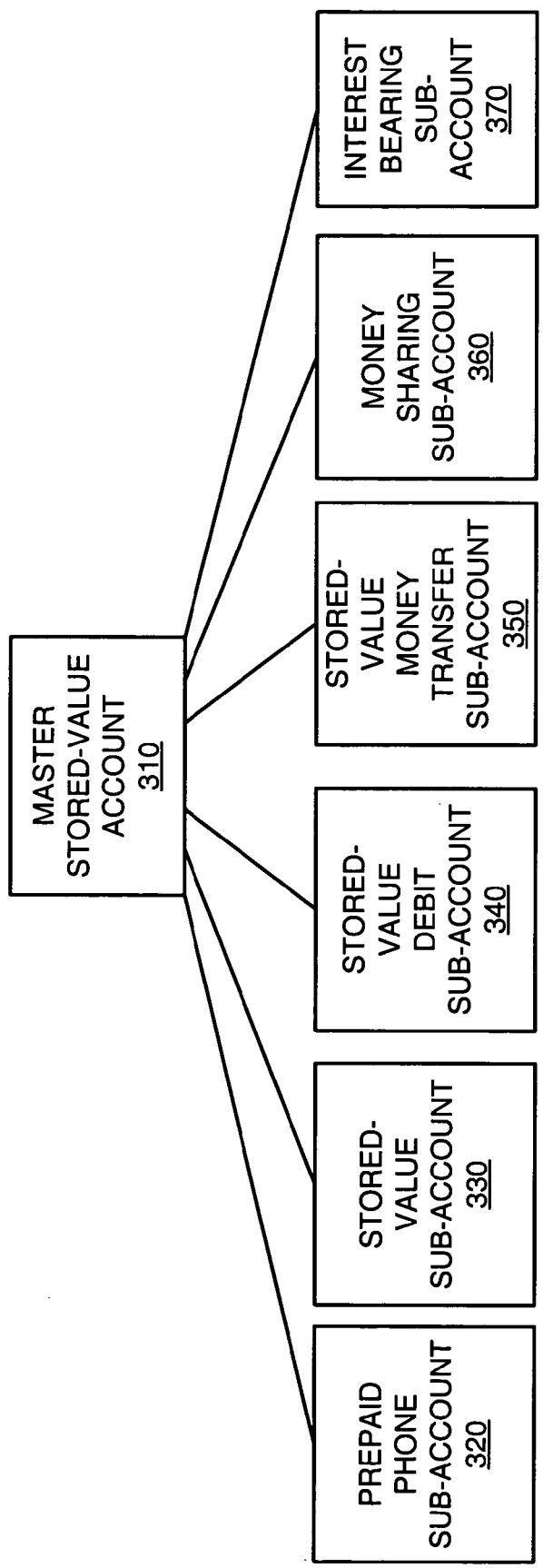
FIG. 3 is a block diagram of a master stored-value account and sub-accounts in an exemplary embodiment of the invention.

FIG. 3 depicts a block diagram of a master stored value account and sub-accounts in an exemplary embodiment of the invention. A master stored-value account 310 is associated with a prepaid phone sub-account 320, a stored-value sub-account 330, a stored-value debit sub-account 340, a stored-value money transfer sub-account 350, a money sharing sub-account 360, and an interest bearing sub-account 370.

The master stored-value account 310 can be a signature- and PIN-based stored-value account. The master stored-value account 310 can be reloaded with funds and used anywhere in the world that a bank card association network (such as Visa/Mastercard) is accepted. In some embodiments, the master stored-value account 310 includes phone card capability, the capability to issue money orders, and the ability to move money into a money-sharing sub-account. The master stored-value account 310 allows movement of some or all of the funds present in the master stored-value account 310 into money sharing sub-accounts. These funds can be accessed by taking a cash advance from the master stored-value account 310 at ATMs and banks worldwide, or by using the specially designed money-share sister card to affect the cash advance at ATMs globally.

In some embodiments, the sister card for sub-accounts is a PIN-required ATM-accessed stored-value card. In other embodiments, the sub-accounts may be for utility bills, school tuition, gift cards, groceries, and other miscellaneous stored-value card programs.

Figure 4:
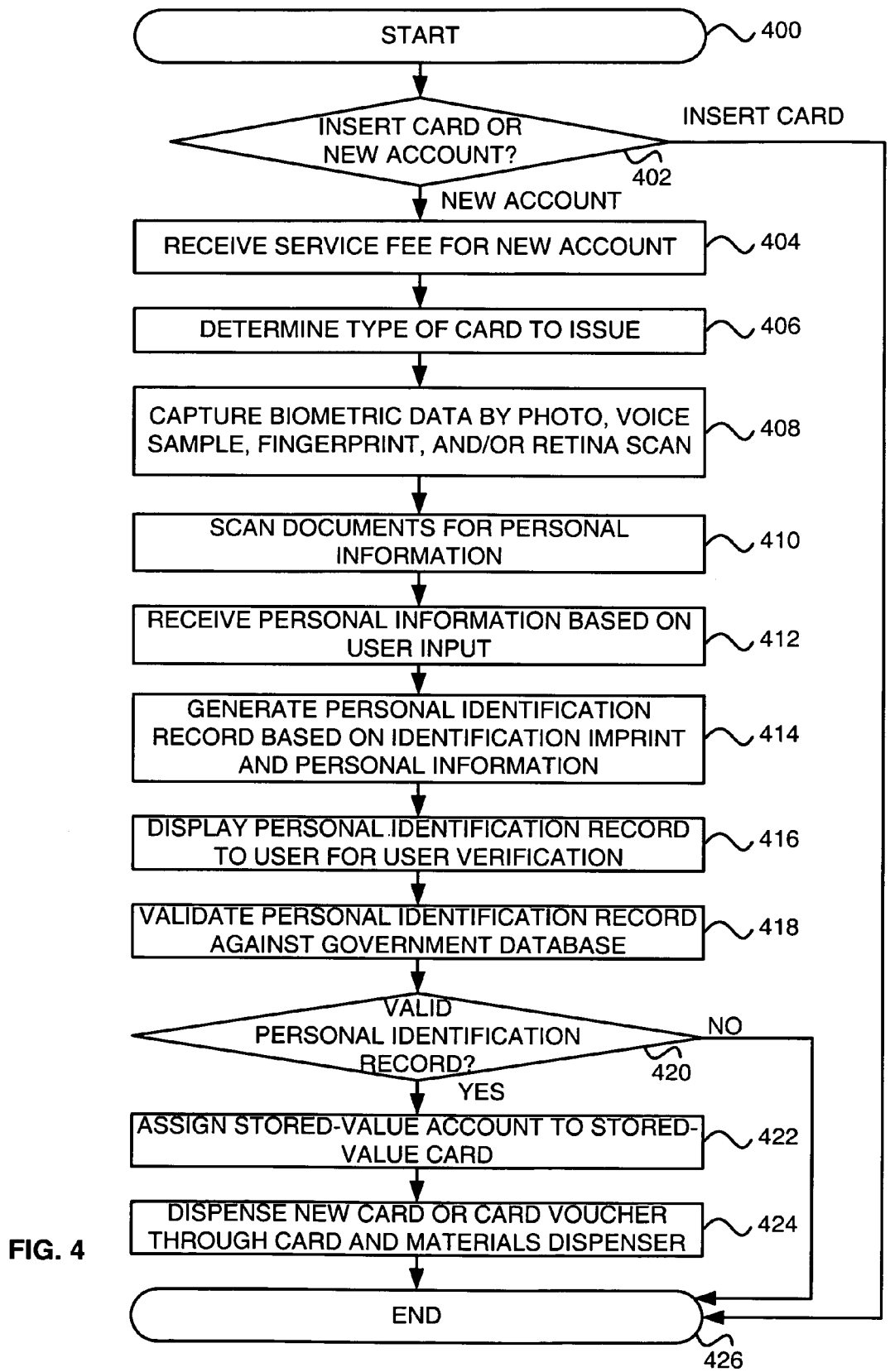
FIG. 4 is a flow chart for a kiosk dispensing a stored-value card in an exemplary embodiment of the invention.

FIG. 4 depicts a flow chart for the kiosk in dispensing a new stored-value card in an exemplary embodiment of the invention. FIG. 4 begins in step 400. In step 402, the processor 150 checks if a stored-value card was inserted or a new stored-value account was requested by the user. If a stored-value card was inserted, the process for dispensing a new stored-value card ends in step 426.

If a new stored-value account was requested, the kiosk 100 receives a service fee for the new account in step 404. The payment for the service fee may be made by cash, check, credit, debit, or another stored-value card. The kiosk 100 may receive the payment through either a check reader 132, the money validation device 136, or any other device in the monetary transaction devices 130 that accepts payment.

In step 406, the processor 150 determines the type of card to issue. In some embodiments, there may be different types of stored-value cards to issue. In step 408, the biometric capture system 180 captures biometric data by photo, voice sample, fingerprint, and/or retina scan of the user of the kiosk 100. The process of capturing the biometric data of a user of the kiosk is described in further detail in U.S. application Ser. No. 10/966,299 entitled "Systems and Methods for Biometric Identification and Verification of a User of a Kiosk" filed on Oct. 15, 2004, which is hereby incorporated by reference.

In step 410, the kiosk 100 scans documents for personal information. In some embodiments, the kiosk 100 scans the documents for personal information through the card reader 120. Some examples of documents that can be scanned are Matricula Consular cards and driver's licenses. In step 412, the kiosk 100 receives personal information based on user input. The kiosk 100 may receive personal information from the audio interface 112, the video interface 114, the keypad 118, the card reader 120, or the biometric capture system 180. Alternative embodiments may use any one or combination of steps 406, 408, and 410 to capture identification and personal information.

In step 414, the processor 150 then generates a personal identification record based on the identification imprint and the personal information. In one embodiment, the personal identification record includes name, local address, place and date of birth, digital photo, digital fingerprint, digital voice print, digital photo of ID e.g. driver's license, Social Security number, tax ID number, and Matricula Consular card number. In some embodiments, the card transaction processing system 220 generates the personal identification record based on the identification imprint and the personal information.

In step 416, the kiosk 100 displays the personal identification record using the video interface 114 or the audio interface 112 for user verification. In step 418, the processor 150 validates the personal identification record against the government database 230. In other embodiments, the card transaction processing system 220 or the member bank system 240 validates the personal identification record against the government database 230. This validation process is described in further detail in U.S. application Ser. No. 10/966,496 entitled "Systems and Methods for Identifying and Verifying a User of a Kiosk Using an External Verification System" filed on Oct. 15, 2004, which is hereby incorporated by reference.

In step 420, the processor 150 checks whether the personal identification record is valid. If invalid, the process ends in step 426. If valid, the processor 150 assigns a stored-value account to the stored-value card in step 422. In other embodiments, the stored-value account is preassigned to the stored-value card. In some embodiments, the card transaction processing system 220 assigns a stored-value account to the stored-value card. In step 424, the kiosk 100 dispenses a new stored-value card, card voucher, and/or printed materials through the dispenser system 140. FIG. 4 ends in step 426.

Figure 5:
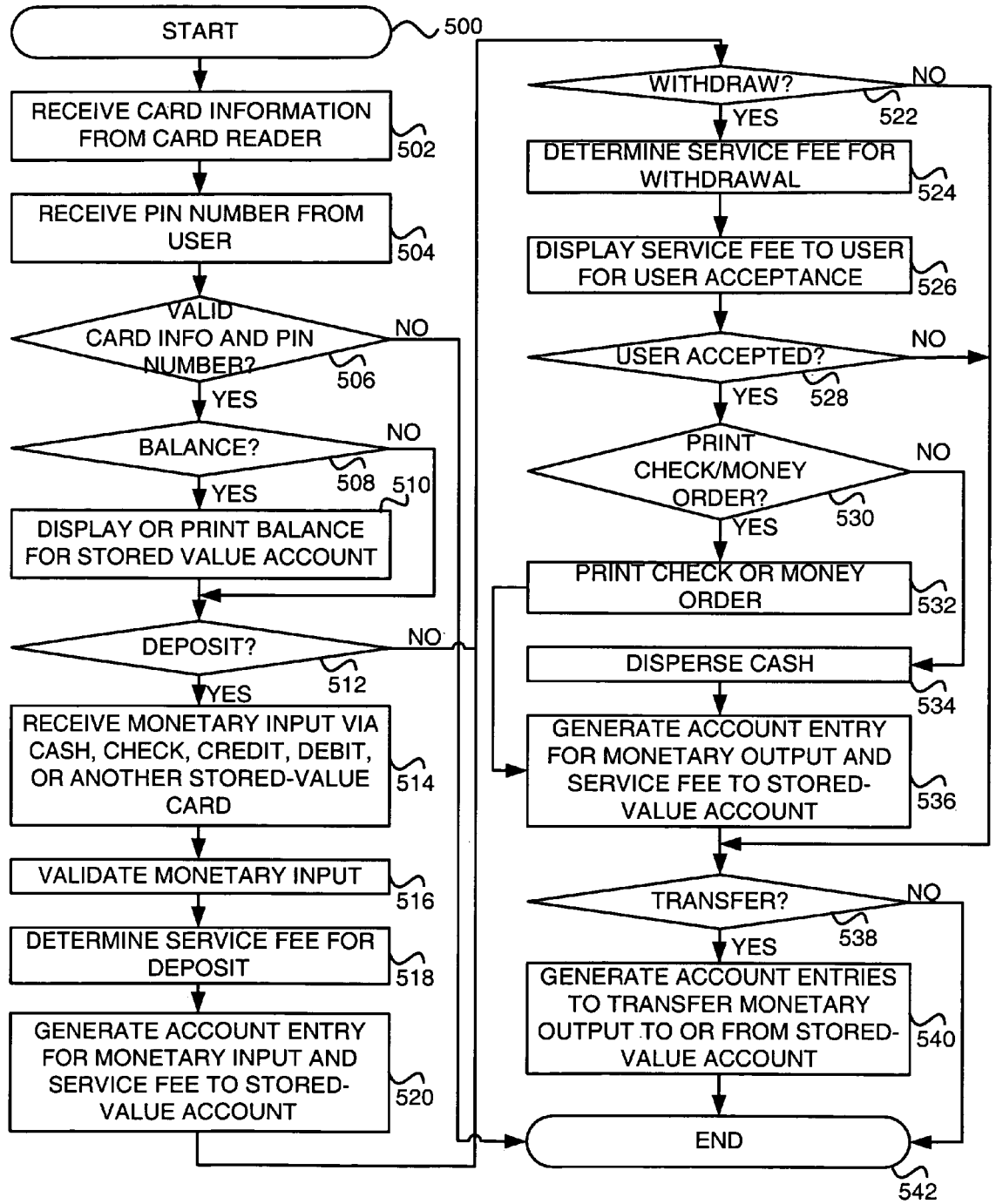
FIG. 5 is a flow chart for a kiosk for performing banking transactions in an exemplary embodiment of the invention.

FIG. 5 depicts a flow chart for a kiosk for banking transactions in an exemplary embodiment of the invention. FIG. 5 begins in step 500. In step 502, the card reader 120 receives card information from the stored-value card. In step 504, the keypad 118 or the video interface 114 receives the PIN number from the user of the kiosk 100. In step 506, the processor 150 then checks whether the card information and the PIN number are valid. If the card information and the PIN number are invalid, the process ends in step 542.

In step 508, the processor 150 checks whether the user has selected to view the balance of their stored-value account. If the user has not selected to view their balance, the process continues to step 512. If the user has selected to view their balance, the video interface 114 displays the balance or the printer 116 prints out the balance for the stored-value account in step 510. In some embodiments, the kiosk 100 provides a card statement, account activity (i.e. last 5 transactions), recent transactions, and/or balances. In some embodiments, the kiosk 100 provides statement information that is required by government regulations. The statement information from the kiosk 100 may provide improved customer service for users that are underbanked or unbanked who may not receive mail or may not have access to the Internet.

In step 512, the processor 150 checks whether the user has selected to deposit money into their stored-value account. If the user has not selected to deposit, the process continues to step 522. If the user has selected to deposit, the kiosk 100 receives monetary input for the stored-value account in step 514. The monetary input may be by cash, check, credit, debit, or another stored-value card. The kiosk 100 may receive the monetary input through either the check reader 132, the money validation device 136, or any other device in the monetary transaction devices 130 that accepts the monetary input. In step 516, the kiosk 100 validates the monetary input.

In step 518, the processor 150 determines a service fee for the deposit. In some embodiments, the card transaction processing system 220 determines the service fee. In some embodiments, the service fee is a flat fee for any deposit. In other embodiments, the service fee is based on a calculation of the amount deposited. For example, the service fee may be a percentage of the amount deposited. In another example, the service fee may be $2.00 for each increment of $100.00 deposited. There are numerous variations in how a service fee for a banking transaction may be calculated.

In some embodiments, the kiosk 100 receives a separate payment for the service fee. The payment for the service fee may be made by cash, check, credit, debit, or another stored-value card. The kiosk 100 may receive the payment through either the check reader 132, the money validation device 136, or any other device in the monetary transaction devices 130 that accepts payment.

In some embodiments, the service fee is deducted from the amount deposited or deducted from the stored-value account. In step 520, the processor 150 generates the account entry for the monetary input deposited to the stored-value account and the service fee. In some embodiments, the monetary input deposited is immediately available in the stored-value account, which may result in instantaneous money sharing among multiple users.

In step 522, the processor 150 checks whether the user has selected to withdraw money from their stored-value account. If the user has not selected to withdraw, the process continues to step 538. If the user has selected to withdraw, the processor 150 determines a service fee for the withdrawal in step 524. In some embodiments, the card transaction processing system 220 determines the service fee. In some embodiments, the service fee is a flat fee for any withdrawal. For example, there may be a flat fee charge of $0.55 for a money order printed. In other embodiments, the service fee is based on a calculation of the amount withdrawn. In one example, the service fee is an increase in an exchange rate for foreign currency conversion if the amount withdrawn and the stored-value account are in different currencies.

In step 526, the video interface 114 displays the service fee for the user's acceptance. In step 528, the processor 150 checks whether the user has accepted the service fee via the audio interface 112, the video interface 114, or the keypad 118. If the user has not accepted, the process continues to step 538.

If the user has accepted, the processor 150 checks whether the user has selected to withdraw by printing a check or money order in step 530. If the user has selected to print a check or money order, the check printer 134 prints the check or money order in step 532. In some embodiments, the checks have a preprinted amount that can be validated in real time to check if the funds are available in the stored-value account or that the funds have been deposited and validated in the kiosk 100. In some embodiments, the user of the kiosk 100 can add the payee and the signature for the check. In some embodiments, the check amount is instantaneously debited from the stored-value account to allow "pre-paid" checks as opposed to traditional "post-paid" checks. If the user has not selected to print a check or money order, the kiosk 100 disperses cash in step 534. In step 536, the processor 150 generates an account entry for the service fee and the monetary output withdrawn from the stored-value account.

In step 538, the processor 150 checks whether the user has selected to transfer money from the stored-value account to another account. Some examples of other accounts are described above in FIG. 3. If the user has not selected to transfer, the process ends in step 542. If the user has selected to transfer, the processor 150 generates account entries to transfer the monetary output from the stored-value account in step 540. In some embodiments, a service fee may be charged for the transfer of money between accounts. In some embodiments, the user can only transfer to the accounts that the user owns. In other embodiments, the user owns a master account and transfers to sub-accounts that are for sharing with or providing access to other users. In some embodiments, the user may select to undo the transfer. FIG. 5 ends in step 542. Another example of a banking transaction is money sharing, which is described in further detail in U.S. patent application No. Ser. No. 10/966,958 entitled "Systems and Methods for Money Sharing" filed on Oct. 15, 2004, which is hereby incorporated by reference. Also, in some embodiments, the user may send an e-mail through the kiosk 100, and the kiosk 100 may display a reply e-mail for customer services purposes.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processors, and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of operating a kiosk that generates revenue from financial services, the method comprising:
    determining an identity of a user at a kiosk;
    transmitting identity information from the kiosk, the identity information associated with a personal identification record for the user;
    receiving a validation of a the personal identification record of the user by the kiosk based on a government database; and
    if the personal identification record of the user of the kiosk is valid, then, determining a stored-value account related to a stored-value card for a user of the kiosk,
    remotely accessing a stored cash value associated with the stored-value account by the kiosk,
    performing a banking transaction using the stored-value account;
    determining a service fee for the banking transaction; and
    deducting the service fee from the stored-value account or a value of the banking transaction.

2. The method of claim 1 wherein the service fee comprises a flat fee.

3. The method of claim 1 wherein the service fee is based on a calculation.

4. The method of claim 3, further comprising:
    receiving personal information from a user at the kiosk; and
    creating a stored-value account for the user in response to receiving the personal information, the stored value card not containing financial balance data for the stored value account.

5. The method of claim 3 wherein the calculation is based on an exchange rate for a foreign currency conversion.

6. The method of claim 1 further comprising dispensing the stored-value card from the kiosk.

7. The method of claim 1 further comprising receiving user instructions for the banking transaction and wherein performing the banking transaction is based on the user instructions.

8. The method of claim 1 further comprising assigning the stored-value account to the stored-value card in the kiosk.

9. The method of claim 1 wherein determining the stored-value account related to the stored-value card further comprises:
    receiving the stored-value card into the kiosk; and
    processing the stored-value card.

10. The method of claim 1 wherein the stored-value card is compatible with a bank card association network.

11. The method of claim 1 wherein the banking transaction comprises depositing a monetary amount into the stored-value account.

12. The method of claim 1 wherein the banking transaction comprises withdrawing a monetary amount from the stored-value account.

13. The method of claim 1 wherein the banking transaction comprises transferring a monetary amount from the stored-value account to another account.

14. A kiosk for performing financial services that generates revenue, the kiosk comprising:
    a dispenser system configured to dispense a stored-value card from the kiosk;
    a processor configured to:
        determine an identity of a user at a kiosk;
        transmit identity information from the kiosk, the identity information associated with a personal identification record for the user;
        receive a validation of the personal identification record of a user of the kiosk based on a government database, and
        if the personal identification record of the user of the kiosk is valid, then:
            create a stored-value account for a user of the kiosk, associate the stored value card with the stored value account, perform a banking transaction using the stored-value account, determine a service fee for the banking transaction, and deduct the service fee form the stored-value account or a value of the banking transaction; and
    a storage system configured to store data.

15. The kiosk of claim 14 wherein the service fee comprises a flat fee.

16. The kiosk of claim 14 wherein the service fee is based on a calculation.

17. The kiosk of claim 16 wherein the calculation comprises a percentage of the value of the banking transaction.

18. The kiosk of claim 16 wherein the calculation is based on an exchange rate for a foreign currency conversion.

19. The kiosk of claim 14 wherein the processor is configured to receive user instructions for the banking transaction and perform the banking transaction based on the user instructions.

20. The kiosk of claim 14 wherein the processor is configured to assign the stored-value account to the stored-value card in the kiosk.

21. The kiosk of claim 14 further comprising a card reader configured to receive the stored-value card into the kiosk and process the stored-value card.

22. The kiosk of claim 14 wherein the stored-value card is compatible with a bank card association network.

23. The kiosk of claim 14 wherein the banking transaction comprises depositing a monetary amount into the stored-value account.

24. The kiosk of claim 14 wherein the banking transaction comprises withdrawing a monetary amount from the stored-value account.

25. The kiosk of claim 14 wherein the banking transaction comprises transferring a monetary amount from the stored-value account to another account.

26. A computer readable storage medium having embodied thereon executable instructions for a processor performing a method for operating a kiosk to perform financial services, the method comprising:

receiving a stored value card and user data at the kiosk;

determining an identity of a user from the a stored value card and user data;

transmitting identity information from the kiosk, the identity information associated with a personal identification record for the user;

receiving a validation of the personal identification record of the user by the kiosk based on a government database;

determining a stored-value account related to the stored-value card for the user of the kiosk;

performing a banking transaction using the stored-value account;

determining a service fee for the banking transaction; and deducting the service fee from the stored-value account or a value of the banking transaction.

27. The computer readable storage medium of claim 26, wherein the service fee comprises a flat fee.

28. The computer readable storage medium of claim 26, wherein the service fee is based on a calculation.

29. The computer readable storage medium of claim 28, wherein the calculation comprises a percentage of the value of the banking transaction.

30. The computer readable storage medium of claim 28, wherein the method further includes validating a personal identification record of a user of the kiosk based on a government database storing law enforcement data.

31. The computer readable storage medium of claim 26, further comprising dispensing the stored-value card from the kiosk.

32. The computer readable storage medium of claim 26, further comprising receiving user instructions for the banking transaction and perform the banking transaction based on the user instructions.

33. The computer readable storage medium of claim 26, further comprising assigning the stored-value account to the stored-value card in the kiosk.

34. The computer readable storage medium of claim 26, further comprising determining whether the stored-value card is compatible with a bank card association network.

35. The computer readable storage medium of claim 26, further comprising depositing a monetary amount into the stored-value account.

36. The computer readable storage medium of claim 26, further comprising withdrawing a monetary amount from the stored-value account.

37. The computer readable storage medium of claim 26, further comprising transferring a monetary amount from the stored-value account to another account.

* * * * *

UNITED STATES PATENT AND TRADEMARK OFFICE
CERTIFICATE OF CORRECTION

PATENT NO.        : 7,641,113 B1                                       Page 1 of 1
APPLICATION NO. : 10/966497
DATED             : January 5, 2010
INVENTOR(S)       : Alvarez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 962 days.

Signed and Sealed this

Sixteenth Day of November, 2010

David J. Kappos
*Director of the United States Patent and Trademark Office*